(12) United States Patent
Scheideler et al.

(10) Patent No.: US 11,176,149 B2
(45) Date of Patent: Nov. 16, 2021

(54) PREDICTED DATA PROVISIONING FOR ANALYTIC WORKFLOWS

(71) Applicant: International Business Machines Corporation, Armonk, NY (US)

(72) Inventors: Tim Uwe Scheideler, Schoenenberg (CH); Thorsten Muehge, Budenheim (DE); Erik Rueger, Ockenheim (DE); Thomas Snellgrove, Wakefield, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 237 days.

(21) Appl. No.: 16/539,261

(22) Filed: Aug. 13, 2019

(65) Prior Publication Data
US 2021/0049168 A1 Feb. 18, 2021

(51) Int. Cl.
| | |
|---|---|
| *G06F 16/2458* | (2019.01) |
| *G06F 16/25* | (2019.01) |
| *G06F 16/2455* | (2019.01) |
| *G06F 9/54* | (2006.01) |
| *H04L 29/08* | (2006.01) |

(52) U.S. Cl.
CPC .......... *G06F 16/2465* (2019.01); *G06F 9/546* (2013.01); *G06F 16/24565* (2019.01); *G06F 16/252* (2019.01); *H04L 67/12* (2013.01); *H04L 67/22* (2013.01); *H04L 67/26* (2013.01)

(58) Field of Classification Search
CPC ......... G06F 12/0862; G06F 2212/1024; G06F 12/1027; G06F 12/1045; G06F 16/00; G06F 16/24532; G06F 16/24568; G06F 16/254; G06F 2212/6028; G06F 16/2465;
(Continued)

(56) References Cited

U.S. PATENT DOCUMENTS

| | | |
|---|---|---|
| 10,055,483 B2 | 8/2018 | Lafuente Alvarez |
| 10,108,672 B2 | 10/2018 | Curtin |

(Continued)

OTHER PUBLICATIONS

Maatouk, et al., "Age of Information With Prioritized Streams: When to Buffer Preempted Packets?", arXiv:1901.05871v1 [cs.IT] Jan. 17, 2019, 6 pages, <https://arxiv.org/pdf/1901.05871.pdf>.

*Primary Examiner* — Shean Tokuta
(74) *Attorney, Agent, or Firm* — Erik C. Swanson; Andrew D. Wright; Roberts Calderon Safran & Cole, P.C.

(57) ABSTRACT

A computer-implemented method for performing an analytic workflow process is provided. The method includes storing data from multiple input sources into a data storage pool, performing at least one analytic workflow executed by computing nodes, identifying data, by an analyzer module, expected to be required for a downstream analytic step. Thereby, the identified data have not yet been received in the in-memory database. The method also includes triggering a push module to move the identified data from the data storage pool to the in-memory database. Additionally, the method includes monitoring, by the analyzer module, output data of an analytic step and identifying pointers to additional data expected to be required for a downstream analytic step of a parallel analytic workflow process different to the analytic step of the monitored output data, and moving, by a push module, the data referred to by the pointers to the in-memory database.

16 Claims, 6 Drawing Sheets

(58) Field of Classification Search
CPC .. G06F 16/24565; G06F 16/252; G06F 9/546; H04L 67/12; H04L 67/22; H04L 67/26
See application file for complete search history.

(56) References Cited

U.S. PATENT DOCUMENTS

| | | | | |
|---|---|---|---|---|
| 10,282,689 | B1* | 5/2019 | Johnston | G06Q 10/0633 |
| 10,754,791 | B2* | 8/2020 | Britto | G06F 12/1045 |
| 10,999,696 | B1* | 5/2021 | Manz | H04W 4/40 |
| 2013/0212234 | A1* | 8/2013 | Bartlett | G06F 9/5027 709/220 |
| 2014/0108741 | A1* | 4/2014 | Boettiger | G06F 12/0862 711/137 |
| 2014/0146676 | A1 | 5/2014 | Howes | |
| 2015/0149615 | A1* | 5/2015 | Broussard | G06F 9/5083 709/224 |
| 2015/0212797 | A1* | 7/2015 | Bordawekar | G06F 7/36 707/753 |
| 2015/0381725 | A1* | 12/2015 | Haapaoja | H04L 67/1097 709/213 |
| 2016/0227037 | A1* | 8/2016 | Roybal | H04M 3/5166 |
| 2016/0267157 | A1* | 9/2016 | Mutschler | G16H 40/20 |
| 2016/0350093 | A1* | 12/2016 | Walker | H04L 9/3247 |
| 2017/0089739 | A1* | 3/2017 | Gallo | G01D 9/32 |
| 2017/0102693 | A1* | 4/2017 | Kidd | G05B 19/41875 |
| 2017/0199875 | A1* | 7/2017 | Nevrekar | G06F 40/186 |
| 2017/0220605 | A1* | 8/2017 | Nivala | G06F 16/9024 |
| 2018/0095952 | A1* | 4/2018 | Rehal | G06F 16/213 |
| 2018/0203904 | A1* | 7/2018 | Barsness | G06F 16/24575 |
| 2019/0339416 | A1* | 11/2019 | Elkabetz | G01W 1/10 |
| 2019/0339688 | A1* | 11/2019 | Celia | G05B 19/41865 |
| 2020/0013498 | A1* | 1/2020 | Gelber | G16H 10/60 |
| 2020/0233905 | A1* | 7/2020 | Williams | G06F 16/221 |
| 2020/0241962 | A1* | 7/2020 | Dain | G06F 11/1458 |
| 2020/0259896 | A1* | 8/2020 | Sachs | H04W 12/03 |
| 2020/0327252 | A1* | 10/2020 | McFall | G06F 21/602 |
| 2020/0348662 | A1* | 11/2020 | Cella | G05B 23/024 |
| 2020/0364953 | A1* | 11/2020 | Simoudis | B60W 60/001 |
| 2021/0049168 | A1* | 2/2021 | Scheideler | G06F 9/542 |
| 2021/0124983 | A1* | 4/2021 | Axenie | G06K 9/6263 |
| 2021/0136121 | A1* | 5/2021 | Crabtree | H04L 63/1425 |
| 2021/0136122 | A1* | 5/2021 | Crabtree | H04L 63/1441 |
| 2021/0194960 | A1* | 6/2021 | Ventimiglia | G01P 15/14 |

* cited by examiner

PREDICTED DATA PROVISIONING FOR ANALYTIC WORKFLOWS

BACKGROUND

The present invention generally relates to the field of data analytics, and more particularly, to a method, computer system, and computer program product for performing an analytic workflow process.

Big and stream data requirements make data analytics a top priority for enterprise information technology (IT) groups. One aspect of future information and communication technology (ICT) is the attempt to provide individual real-time information, guidance and, e.g., advertisements based on a mixture of individual (actual and historical) online activities and Internet of Things (IoT) traces.

Individuals as well as goods equipped with sensors, radio frequency identification (RFID) tags or simple scanned barcodes leave permanent traces in electronic systems. People are constantly creating data while moving, shopping, using social media, and so on. Potentially, this pool of information could be used to interact with each individual person, e.g., in the form of mobile advertisements based on real-time activities, health recommendations, optimized travel recommendations (parking, etc.), and so on.

Additionally, streaming analytics (i.e., applying analytic methods to streaming data) can help detecting suspicious activities representing a threat to secure financial transactions and identifying security attacks to IT systems.

IT systems that are able to provide such real-time service need to fulfill at least the following requirements: high-speed analysis and working with large data pools collecting data from different data streams. The performance of said touch analysis solutions are mainly driven by the speed at which the data is provided to the host system for processing, i.e., basically the speed of the underlying analytic workflow, as well as the processing power of the related computing nodes. Thereby, a staging and de-staging process is required to ensure that necessary data is available in time for the data analysis. If this process fails, the overall performance drops resulting in a slowed-down and/or delayed analysis. This can cause a delayed analysis result that could have been used to trigger an action in real life if generated on time, e.g., a mobile advertisement may be generated too late, i.e., the addressee may have already left the place in which the advertisement may have been successful.

Thus, there can be a need to organize analytic workflows of multiple streaming data in combination with more static data in a way to reduce delays in the analytic workflows.

SUMMARY

According to one aspect of the present invention, a computer-implemented method for performing an analytic workflow process may be provided. The method may include, storing data originating from a plurality of input sources into a data storage pool, providing an in-memory database for receiving data from the data storage pool, performing at least one analytic workflow in each of which a plurality of analytic steps is executed by another plurality of computing nodes accessing the data in the in-memory database, and identifying data, by an analyzer module, in the data storage pool expected to be required for a downstream analytic step in the at least one analytic workflow. Thereby the identified data have not yet been received in the in-memory database.

The method may further include moving, by a push module, the identified data from the data storage pool to the in-memory database, the push module is triggered by the analyzer module, and monitoring, by the analyzer module, output data of an analytic step and identifying pointers to additional data expected to be required for a downstream analytic step of a parallel analytic workflow process different to the analytic step of the monitored output data. Additionally, the method may include moving, by a push module, the data referred to by the pointers to the in-memory database.

According to another aspect of the present invention, an analytic workflow system for performing an analytic workflow process may be provided. The analytic workflow system may include a data storage pool unit adapted for storing data originating from a plurality of input sources, an in-memory database module adapted for receiving data from the data storage pool, and an analytic workflow execution unit adapted for performing at least one analytic workflow in each of which a plurality of analytic steps may be executed by another plurality of computing nodes accessing the data in the in-memory database.

The analytic workflow system may further include an analyzer module adapted for identifying data in the data storage pool expected to be required for a downstream analytic step in the at least one analytic workflow, the identified data have not yet been received in the in-memory database, and a push module adapted for moving the identified data from the data storage pool to the in-memory database, the push module may be triggered by the analyzer module. Thereby, the analyzer module may also be adapted for monitoring output data of an analytic step and identifying pointers stored in a pointer storage to additional data expected to be required for a downstream analytic step of a parallel analytic workflow process different to the analytic step of the monitored output data. The push module may also be adapted for moving the data referred to by the pointers to the in-memory database.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
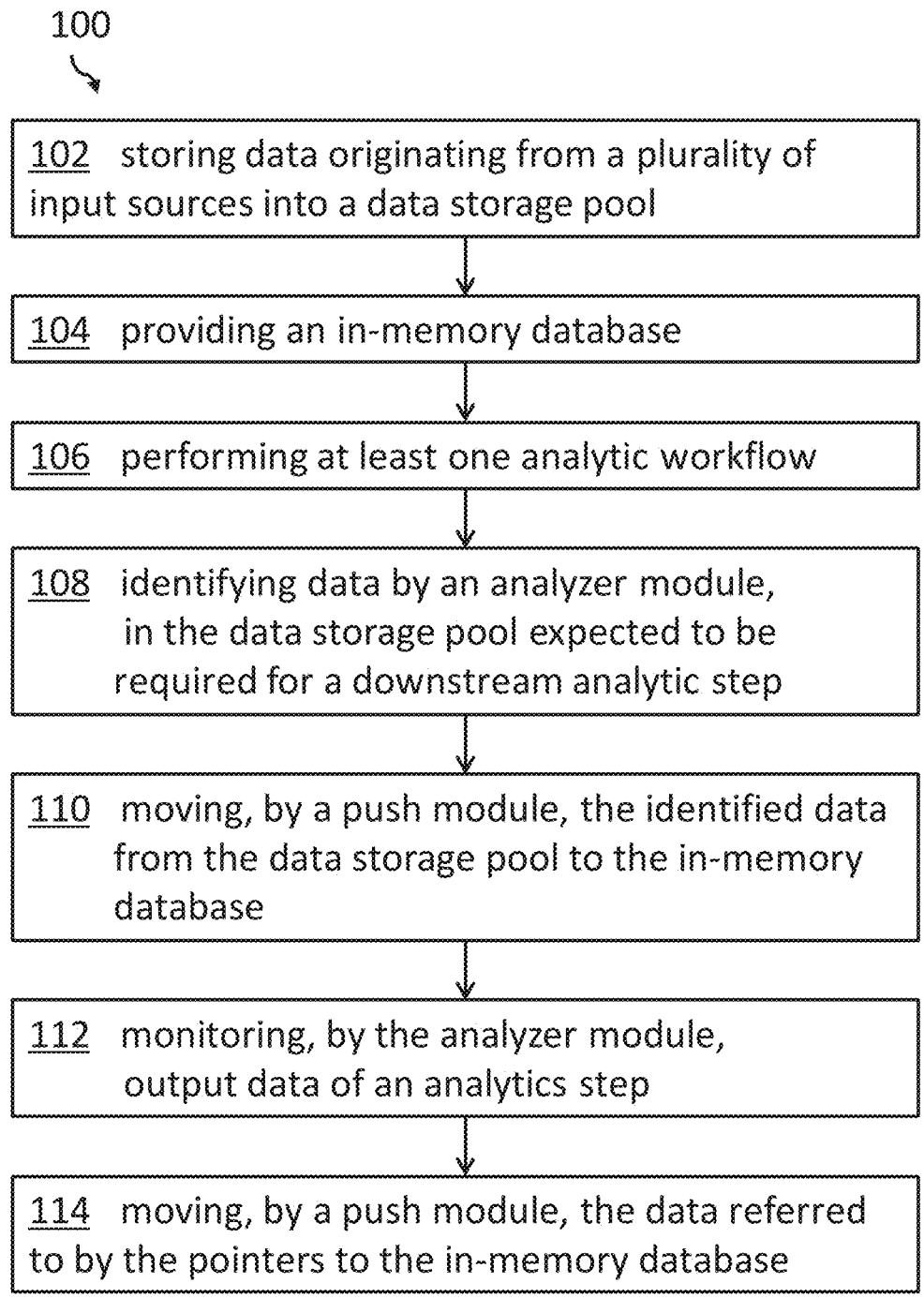

Preferred embodiments of the invention will be described, by way of example only, and with reference to the following drawings:

FIG. 1 is a flowchart depicting a computer-implemented method for performing an analytic workflow process, according to an embodiment of the present disclosure.

Figure 2:
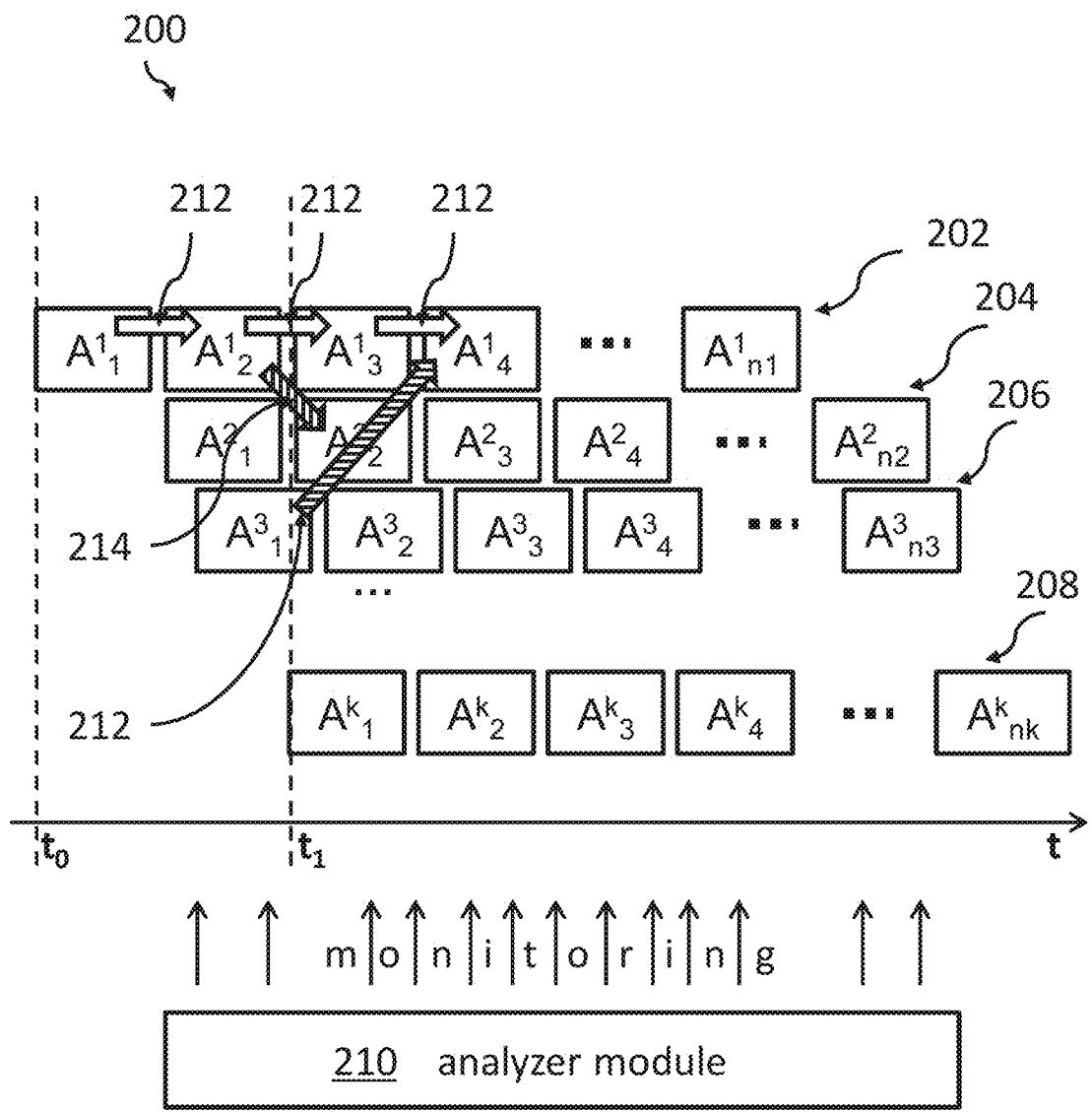

FIG. 2 is a block diagram depicting a plurality of analytic workflows, according to an embodiment of the present disclosure.

Figure 3:
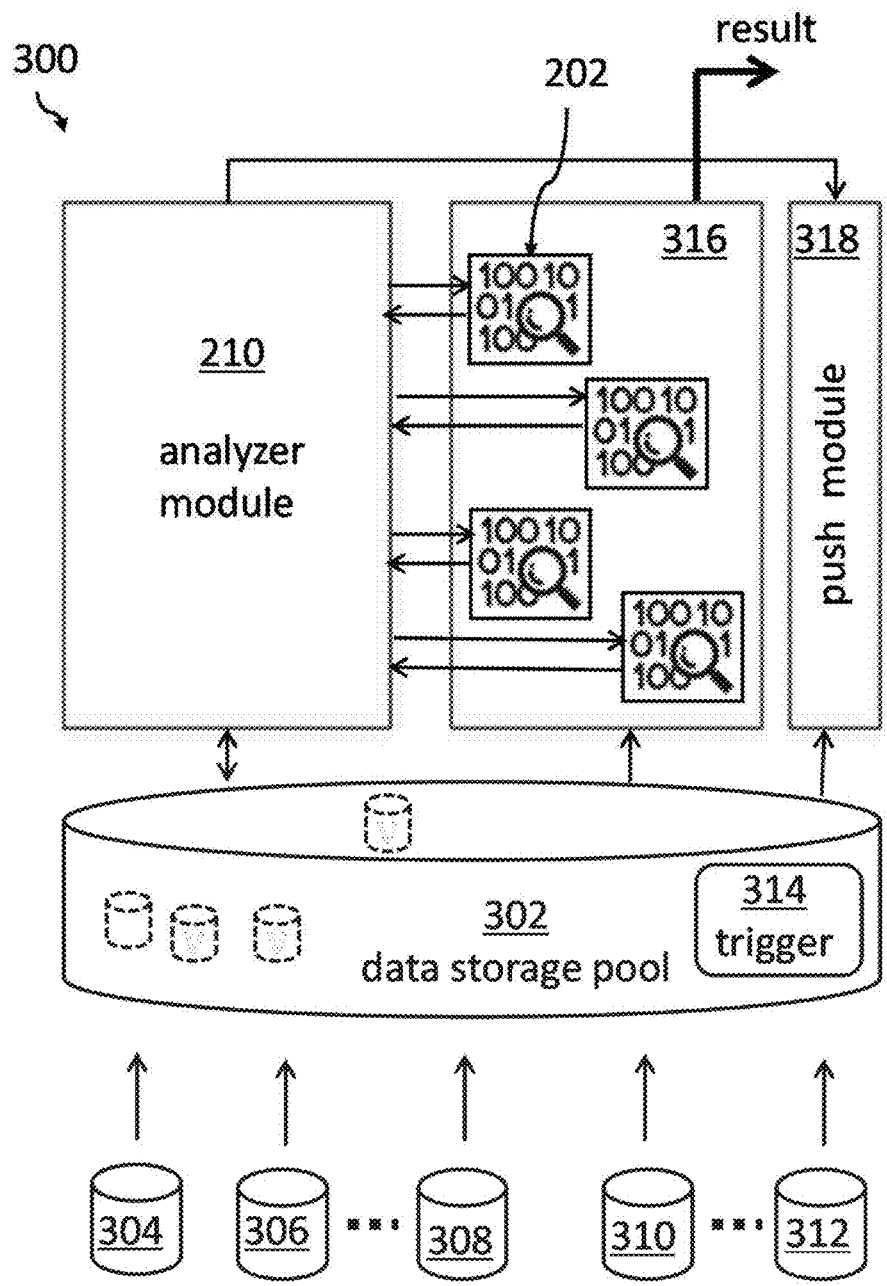

FIG. 3 is a block diagram depicting an exemplary implementation of the proposed system for performing an analytic workflow process, according to an embodiment of the present disclosure.

Figure 4:
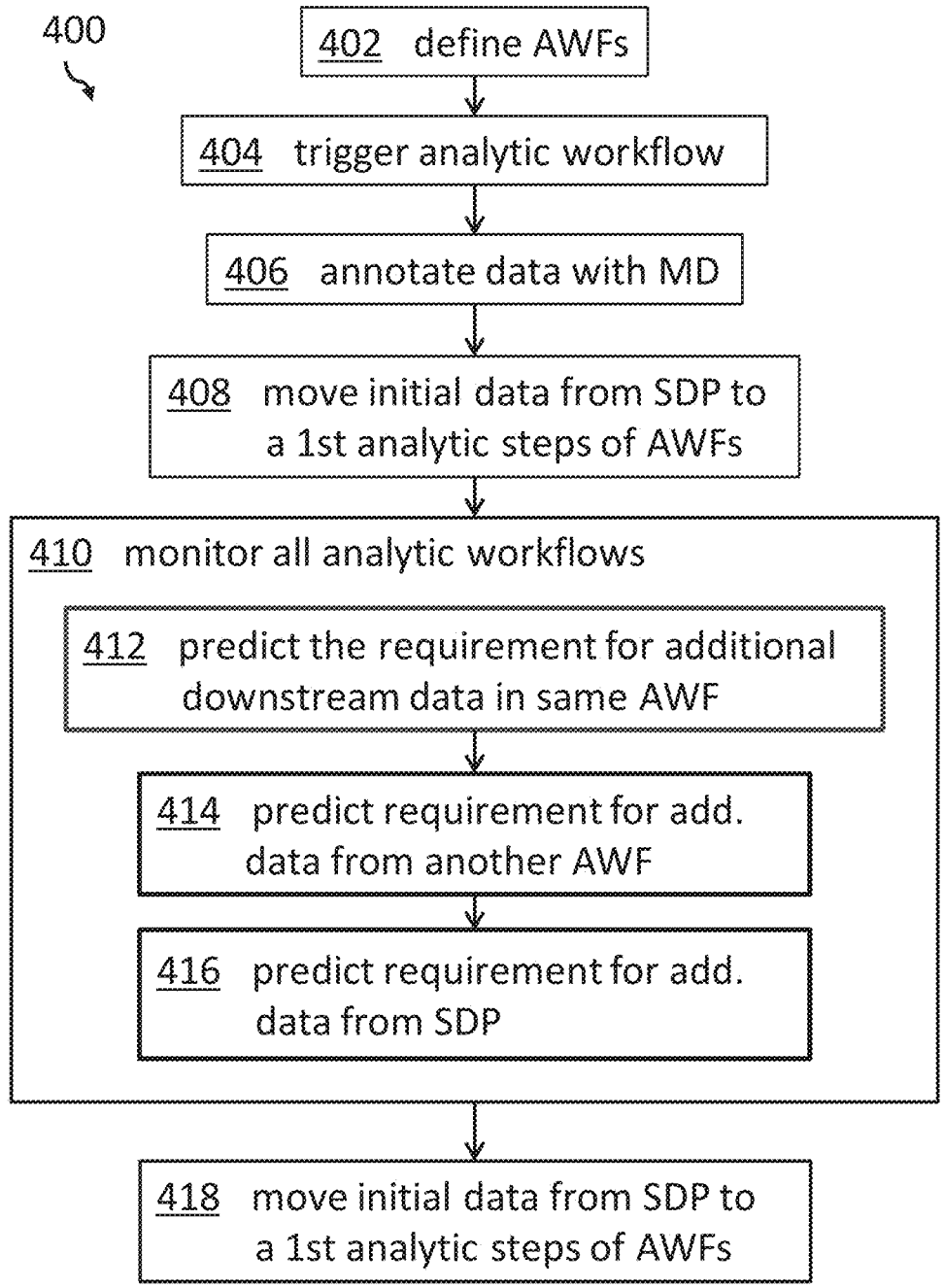

FIG. 4 is a flowchart depicting steps of the proposed method for performing an analytic workflow process, according to an embodiment of the present disclosure.

Figure 5:
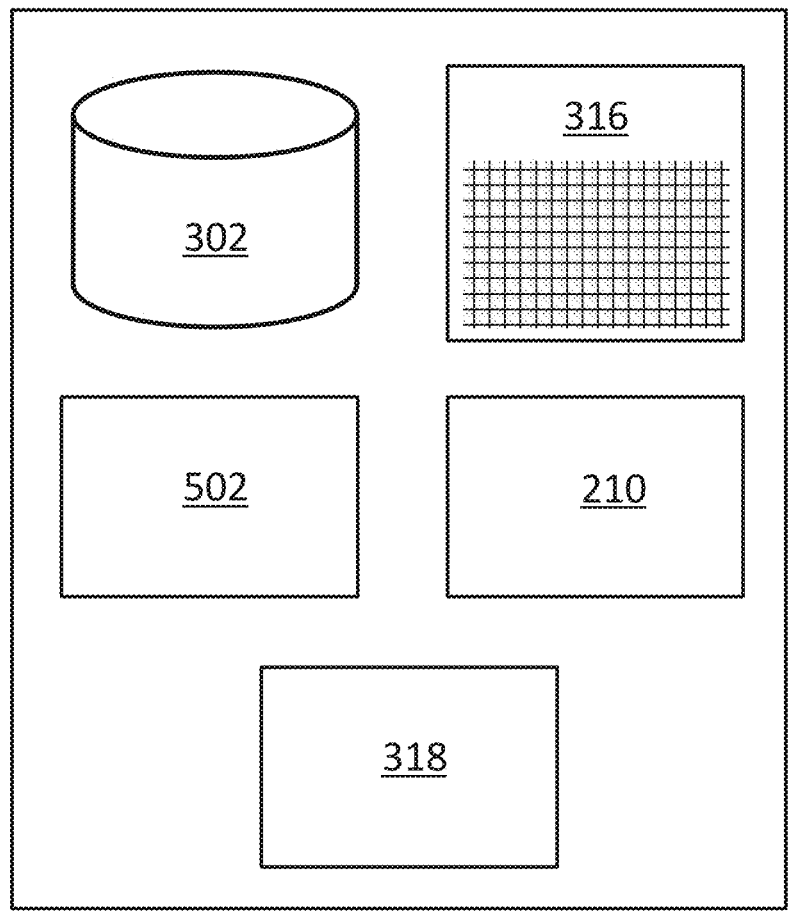

FIG. 5 is a block diagram of the analytic workflow system for performing an analytic workflow process, according to an embodiment of the present disclosure.

Figure 6:
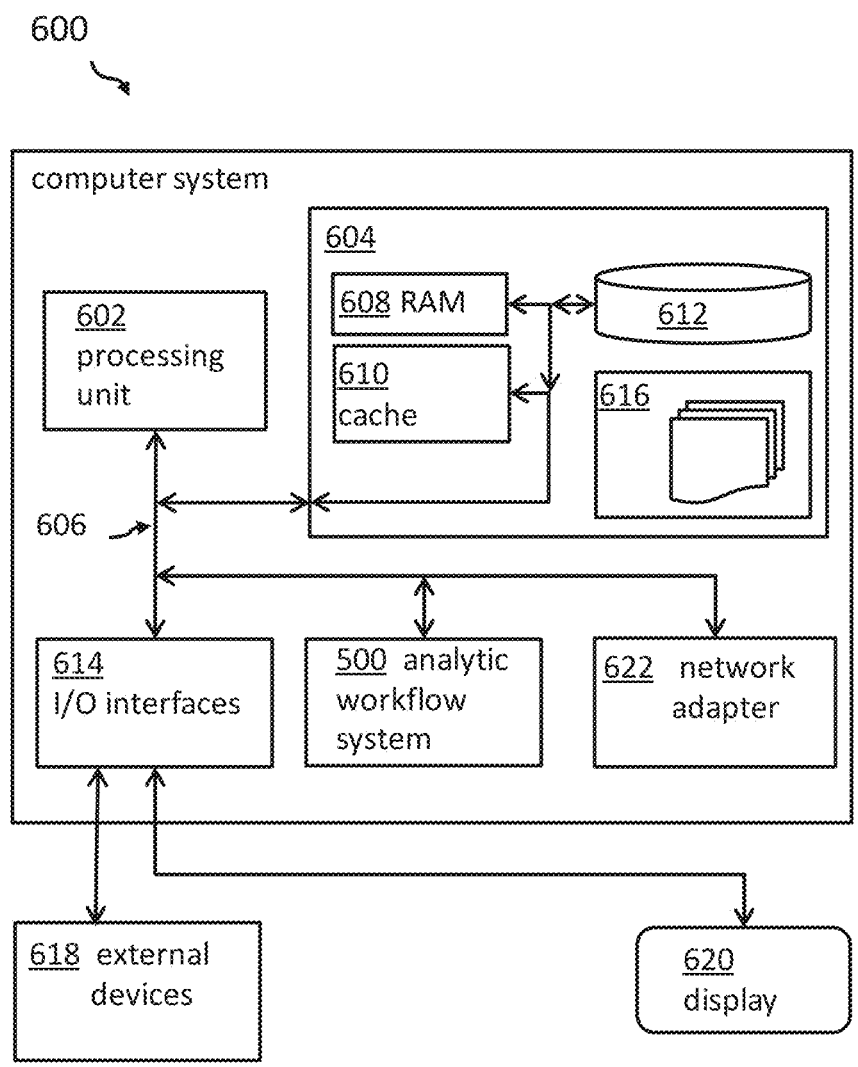

FIG. 6 is a block diagram depicting an embodiment of the computing system for implementing the proposed analytic workflow process, according to an embodiment of the present disclosure.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

In the context of this description, the following conventions, terms and/or expressions may be used:

The term 'analytic workflow process' may denote a plurality of analytic workflows, each including a plurality of chained analytic steps. The analytic is related to an analysis of data in the known data analytics sense. The data may be staged in a data storage pool and may have been received from various online sources. The data may be structured or so-called unstructured data.

The term 'input sources' may denote online or off-line data sources providing a more or less constant stream of data, like messaging systems, credit card processing systems, other online banking systems, video streams and similar.

The term 'data storage pool' may denote a physical or virtual storage system receiving data from the plurality of input sources. The data storage pool may be organized as a database, a plurality of databases or flat files and/or a mixture of both. But the data storage pool may be organized to store all received data on one physical system or on distributed storage systems which may be linked by a storage area network.

The term 'in-memory database' may denote a database which runs permanently and stores data in an online storage of a computing system, e.g., the RAM (random access memory) of a computer. This may be in contrast to the classical database which data are typically stored on spinning disks.

The term 'analytic workflow' may denote a defined sequence of analytic steps being executed one after the other and using input data from a previous analytic step off from another source data. Those analytic steps being executed earlier may be denoted as upstream analytic steps, those being executed at a later point in time seen from a reference point in time may be denoted as downstream analytic steps.

The term 'computing nodes' may denote computing nodes including at least one processor and memory being operated under an operating system and additional software.

The term 'analyzer module' may denote a system—either implemented in hardware or in software or in a combination of both—monitoring continuously all analytic steps of all analytic workflows—in particular the related data flows—and adapted to trigger a push module so that required data for a specific analytic step are provisioned at the required time point as input of the specific analytic step. For this, the analyzer module may use machine-learning techniques. In any case, the analyzer module needs to have information about the analytic workflows and its individual steps, and which specific data may be required at what time from which source for a given analytic step. Thus, the analyzer module may balance the data flow from the analytic workflows, e.g., due to different computing powers of different computing nodes executing individual analytic steps. Additionally, network imbalances or delays may be rebalanced this way.

The term 'expected to be required' may denote that output data of one upstream analytic step—e.g., from another analytic workflow—may in future be required for another specific analytic step. However, the expression "expected to be required" does not mean that the data may always, and in any case be required. Rather, the requirement for the data may depend on upstream analytic steps and its outcomes. Thus, the analytic workflows are not strong deterministic in a way that they may always be executed in the same way. However, the analytic steps and the execution and outcome may depend heavily on upstream analytic steps in the analytic workflows.

The term 'push module' may denote a system—either being implemented in hardware or in software of any combination of both—adapted for moving data from the data storage pool to the beginning of the analytic workflows, as well as to downstream analytic steps. The push module may also be adapted for providing output data of an upstream analytic step—in the same or another analytic workflow—to a downstream analytic step. This way, the push module together with the analyzer module may be enabled to avoid any data congestions within the analytic workflows as well as any weight cycles for individual analytic steps.

The term 'storage area network' (SAN) may denote a computer network which may provide access to consolidated, typically block-level data storages. SANs may primarily be used to enhance accessibility of storage devices, such as disk arrays to servers so that the devices appears to the operating system as locally-attached devices. A SAN may typically be a dedicated network of storage devices not accessible through the local area network (LAN) but other devices, thereby preventing interference of LAN traffic in data transfer.

The term 'event' may denote the occurrence of a specific data pattern and one of the incoming streaming data to the data storage pool. Such an event may be detected by known streaming analytic techniques. The event may be the reason to start the analytic workflow process.

Embodiments of the present invention generally relates to the field of data analytics, and more particularly, to a method, computer system, and computer program product for performing an analytic workflow process. The following described exemplary embodiments provide a system, method, and computer program product to, among other things, organize analytic workflows of a plurality of multiple streaming data in combination with additional static data in a way such that the data is not stored in locations required for the analytic process, thereby reducing delays in the analytic workflows. Therefore, the present embodiments have the capacity to improve the technical field of data analytics by continuously analyzing a plurality of analytic workflows for data in a data storage pool to optimize the analytic workflow process including a plurality of analytic workflows. The data flow and data provisioning within the individual analytic workflows may be optimized in a way such that individual analytic steps within each of the plurality of analytic workflows may not need to wait for an availability of further data, either expected or unexpected.

The combination of an analyzer module with a push module may guarantee that all data required as input for an analytic step may always be available in time so that wait cycles for individual analytic steps may be avoided altogether. This may increase the overall performance of the analytic workflow process so that there is no delay in generation/detection of marketing activities, detection of potentially illegal activities and/or security threats. By timely detecting potentially illegal activities, appropriate actions can be taken to stop or prevent their occurrence.

The proposed embodiments may be applied to different types of data including data addressed as well as data in motion (i.e., streaming data).

Due to the fact that an analytic workflow process including a plurality of individual analytic workflows can be triggered by a specific event (e.g., a trigger event in the incoming data to the data storage pool)—and can be started with all of the individual analytic workflows being performed in individual analytic steps and in parallel, the underlying data logistic process may be optimized by the analyzer module in a way that also a dynamic provisioning often re-provisioning of data to input ports of individual analytic steps is possible.

The push module triggered by the analyzer module may bypass upstream analytic steps in order to provision data to a downstream analytic process so that no queue imbalances and/or data congestions are created in the analytic workflows.

Overall, the proposed concept may allow users a shorter reaction time based on a combined analysis of complex streaming data.

In the following, additional embodiments of the method, also applicable to the analytic workflow system, are described:

According to a preferred embodiment of the method, the pointer may point to data in the data storage pool or output data of an upstream analytic step. Typically, output data of one analytic step used as input to another analytic step may only be stored temporarily. However, in some cases the analyzer module may determine that output data of a specific analytic step may be required for another downstream analytic step. Thus, it may be useful to ensure that those are kept temporal—i.e. stored longer—in the in-memory database for further use.

According to an embodiment of the method, the plurality of input sources may originate from at least one selected from the group including: a social media system, a mobile device, a transactional system, a streaming data source, sensor data, smart devices, and messaging systems. Thereby, different trigger events may be used to start the workflow process.

In case of a social media system, the trigger event may be a keyword in a message; in case of a mobile device, it may be its GPS (global positioning system) position; for a transactional system like an order entry system, a customer relationship chip management system, an enterprise resource management system, a banking system and the like which maybe, for example, a specifically ordered product or a credit card number in order to fight illegal or suspicious activities. In case of streaming data from a surveillance camera (i.e., a continuous flow of images), the trigger event may be a detection of a recognized face. However, streaming data may also come from scientific experiments, from IT security systems and the like. Furthermore, the data may come from any kind of sensor data, smart devices or other messaging systems and/or transactional systems and surveillance systems.

According to one embodiment of the method, the compute nodes may be physically independent from each other or integrated into a computing complex. Thus, the compute nodes may be part of a mainframe computer system or a computing system specialized for processing streaming data. The computing system may include at least the main processor(s) making use of one or more GPUs (graphic processing units). The compute nodes may have direct or indirect access to the in-memory database. In one embodiment, the in-memory database may be stored and executed in the random access memory of one or more compute nodes. However, also any other general-purpose computing system may be used for the one or more computing nodes.

According to one embodiment of the method, the data storage pool may include a plurality of storage units connected by a storage area network (SAN). This may ensure a large degree of flexibility in the type of storage units used for different data types. The connecting storage area network may ensure high-speed data transfers from one year to the other and/or into the in-memory database. Thus, it may also be advantageously to connect the in-memory database to the storage area network.

According to another embodiment, the method may also include triggering (i.e., starting) one or more analytic workflows dependent on an event identified in the data storage pool. Specifically, a permanent, e.g., streaming, analytic process, may monitor the incoming data to the data storage pool for determining a specific and predefined trigger event which may be used to trigger a related and predefined analytic workflow process including a plurality of analytic workflows. These analytic workflows may be used to, e.g., confirm the correctness of the trigger event or, start further and deeper analysis of the data relating to the trigger event and combine them with data from other sources.

In another embodiment, the triggering may happen at predetermined time periods in order for regular analysis of one or more of the incoming data streams to the data storage pool.

According to another embodiment of the method, input data for an analytic step may originate from a previous (i.e., upstream) analytic step in the same analytic workflow or from a previous analytic step in the other analytic workflow or from the data storage pool. Thus, each analytic step in each of the parallel executed analytic workflows may use different input data. The required input data may, or may not, be predefined and may, in particular, depend on the output of an upstream analytic process in the same analytic workflow. Thus, the analyzer module may predict the requirement of data in a downstream analytic step and may trigger the push module to provision the required data from the various sources in time a specific analytic step may start.

According to one embodiment of the method, the in-memory database may be implemented in random access memory (RAM) or as flash memory (e.g., NVRAM) of one or more compute nodes. Hence, the in-memory database system may be closely linked to one or more of the computing nodes such that the RAM is in direct access by a computing note.

According to yet another embodiment, the method may also include bypassing, by the push module, one or more analytic steps in the analytic workflow for provisioning data to a downstream analytic step. Thus, it may always be guaranteed that data required for a specific analytic step are available in time to start analytic steps. Consequently, none of the analytic steps may require wait cycles in which the required data may be provided as input data to the analytic step.

Optionally, according to an embodiment, the method may also include annotating, by the analyzer, received data packages, particularly in the data storage pool, with one of a plurality of metadata classes. Such metadata may, e.g., classify incoming data as "class 1" meaning that these data may be required for further analysis, i.e., for later analytic workflow processes. Other data may be classified as transient data on it to be recorded on archives (e.g. "class 3"). Another class of highly relevant data (e.g. "class2") may relate to a trigger event starting one of the analytic workflow processes. The analyzer may also be adapted to relate additional metadata types to the incoming data.

The metadata may also specify how long a received data package may be stored in the data storage pool and what may happen after such a time period with the data package, for example, if it is deleted, archived to a long-term archive (magnetic tape, e.g. class 3 data), stored on a disk system (spinning disk or flash disk) with intermediate access times or prepared to be moved to the in-memory database.

This classification may be performed by a machine-learning system, an implementation of an artificial intelligence system. The machine-learning system may be trained to classify incoming streaming data depending on data patterns in the incoming data or combinations of incoming data from different data streams. The machine-learning system, typically in the form of a classifier system, may be integrated in the analyzer module or may be implemented separately. Also, a combination with a trigger event module may be possible. It may also be possible to implement a known streaming data analytic system to individual ones of the incoming data stream in order to identify a trigger event that starts the proposed analytic workflow process.

In the following, a detailed description of the figures will be given. All instructions in the figures are schematic. Firstly, a block diagram of an embodiment of the inventive computer-implemented method for performing an analytic workflow process is given. Afterwards, further embodiments, as well as embodiments of the analytic workflow system for performing an analytic workflow process, will be described.

Referring now to FIG. 1, a block diagram of an embodiment of the computer-implemented method 100 for performing an analytic workflow process is shown. Each of the analytic workflow sub-processes, also denoted as analytic workflows, may analyze a specific aspect of the incoming data in the data storage pool after an event happened. Such an event may have various forms: in scientific experiments, it may be a specific data pattern of an astronomy or particle science experiment. In another context, it may be a specific keyword or a combination of keywords in a social media network, the occurrence of a credit card number, a data pattern of an IT security system, and so on.

The method 100 includes storing, 102, data originating from a plurality of input sources into a data storage pool. The data storage pool may be a staging area for an analytic system in one or more databases and/or may be organized as a cluster file system, e.g., GPFS (General Parallel FileSystem), or a mixture of both.

The method 100 includes providing, 104, an in-memory database for receiving data from the data storage pool, performing, 106, at least one analytic workflow in each of which a plurality of analytic steps is executed by another plurality of computing nodes accessing the data in the in-memory database, and identifying data, 108, by an analyzer module, in the data storage pool expected to be required for a downstream analytic step in the at least one analytic workflow. Thereby, the identified data have not yet been received in the in-memory database.

Furthermore, the method 100 includes moving, 110, by a push module, the identified data from the data storage pool to the in-memory database, where the push module is triggered by the analyzer module, and monitoring, 112, by the analyzer module, output data of an analytic step, in particular monitored in steps in parallel, and identifying pointers to additional data expected to be required for a downstream analytic step of a parallel analytic workflow process different to the analytic step of the monitored output data.

Further, the method 100 includes moving, 114, by the push module, the data referred to by the pointers to the in-memory database.

Referring now to FIG. 2, a block diagram 200 of an embodiment of a plurality of analytic workflows 202, 204, 206, 208 is shown. Each of these workflows includes a plurality of analysis steps (e.g., A11, A12, . . . , A1$n$1). These steps are performed in a sequence of analytic steps, where typically an output of a first (i.e., upstream) analytic step is passed on to a next (i.e., downstream) analytic step.

Thus, the overall analytic processing of data is broken down into a set of analytic workflows (or a set of analytic sub-processes). These processes are running in chains, i.e., some of the output data of an earlier (upstream) analytic process of a change is part of the input data of a later (downstream) analytic process and the same chain. Data can also be transferred between the sub-process chains (see below). These dependencies between the chains may, according to state-of-the-art technologies, require setting one chain on hold in case the output of an analytic process of another chain is not yet available. This problem can be overcome by using the proposed method.

For the further discussion, the following notion is used: The analytic processing contains k chains $A^c$, c=1, . . . , k. Each chain contains $n_c$ analytic sb-processes dented as $A^c_1, \ldots A^c_{nc}$ running in a sequence.

The analytic workflow sub-processes depend on each other, i.e. output data $O^c_i$ of process $A^c_i$ serves as input data $I^c_k$ for sub-process $A^c_k$, wherein k>i.

The analyzer module 210 performs the following activities and/or method steps to manage data in the in-memory DB:

1) Determine sets of input data $I^c_1, \ldots, I^c_{nc}$ required for analytic processes $A^c_1, \ldots, A^c_{nc}$.

2) Pre-fetch input data $I^c_1$. In case input data $I^c_1$ is modified/updated, keep $I^c_1$ updated in the in-memory database.

3) When $A^c_1$ starts up, pre-fetch part of input data $I^c_2$ which is not an outcome of $A^c_1$.

4) When $A^c_1$ has terminated, receive output data $O^c_1$ of process $A^c_1$ and keep it in the in-memory database.

5) Prepare a complete set of input data $I^c_2 = \{\text{pre-fetched data}, O^c_1\}$. In case of conflict, output data $O^c_1$ has preference over the pre-fetched data.

6) Iterate steps 3-5 for the complete analytic chain $A^c$.

7) Release input data $I^c_{1,\ldots,nc}$ and output data $O^c_{1,\ldots,nc}$ of process chain $A^c$ as long as it is not serving as input data for another process chain.

8) Monitoring the data requested by each analytic workflow. Add tags respectively for the data pre-fetch for the subsequent run.

9) Adjust the tags in case of a mismatch.

In order to move on the data, a push module (not shown) is used. The arrows 212 indicate a sequential forwarding output data from one analytic step (e.g., $A^1_2$) to a next analytic step (e.g., $A^1_3$).

It may also be noted that the individual analytic steps are shown as a sequence in time. The analytic workflow process comprising all analytic workflows 202, 204, 206, 208 starts at to. If analytic steps of different workflows—e.g., $A^1_2$, $A^2_2$—are timewise aligned, a usage of data in the downstream analytic step $A^2_2$ may be used straightforward because the output data of $A^1_2$ are directly available at the time $t_1$ required for the downstream analytic step $A^2_2$. This is indicated by arrow 214.

However, the case is more complex if there is a time gap between the output of an analytic step—e.g., $A^3_1$—of workflow 206 which may be required at a downstream workflow step—e.g., $A^1_4$ which is indicated by arrow 216. In such a case, the analyzer module 210 can deliver its full value. The analyzer module 210 is monitoring all analytic steps of all workflows 202, 204, 206, 208 for the started analytic workflow process. It may be noted that the overall analytic workflow process shall denote here the plurality of workflow processes 202, . . . , 208. It may also be noted that such an analytic workflow process is started if a trigger event has been detected in the data flowing into the data storage pool.

Referring now to FIG. 3, a block diagram 300 illustrating an exemplary implementation of the proposed system is shown. The data storage pool 302 is receiving continuously streams of data in motion 304, 306, 308 and more static data 310, 312 (data at rest) from, e.g., transactional systems. It should be clear that there is no strict boundary between data in motion and data addressed. E.g., credit card data may be denoted as data in motion because there is a constant stream of credit card data (data in motion) generated from credit card payments around the world and controlled by transactions. However, data in motion may be managed by transactional systems. On the other hand, slow changing data in transactional systems like Enterprise Resource Planning (ERP) systems or Customer Relationship Management (CRM) systems may be fed into the data storage pool 302.

It may be noted that the data storage pool 302 can be one large database (a big data pool) or the data storage pool 302 may be organized as a virtual storage system, e.g., based on the known General Parallel File-System (GPFS). In such a case, the data storage pool 302 may be a plurality of storage locations managed with a storage area network (SAN) building one virtual entity with unique addresses within the storage sub-units (symbolically shown as small dashed disk and symbols).

A trigger-monitor 314 which may also be part of the analyzer module 210 (FIG. 2) scans the incoming data continuously. If in the incoming data to the data storage pool 302 a predefined data pattern is recognized or determined by the trigger monitor (trigger event unit) 314, an analytic workflow process with a plurality of analytic workflows 202, 204, 206, 208 may be started for a further analysis relating to data of the triggering event and/or data from other data sources in the data storage pool 302.

The analytic workflows 202, 204, 206, 208 are executed under the control of computer nodes (not shown) of data in the in-memory database 316, to which selected data, defined by the analytic workflows 202, 204, 206, 208, are moved. The analyzer module 210 monitors continuously analytic workflows 202, 204, 206, 208 of data in the in-memory database 316 and, if required, triggers the push module 318 to move and provision the required data according to the received instructions from the analyzer module 210 to locations in the in-memory database 316. Finally, the analytic workflow process produces a result for further usage, e.g., marketing activities, promotion activities and/or further scientific investigations.

Referring now to FIG. 4, an embodiment of a flowchart 400 detailing steps of the proposed method for performing an analytic workflow process is shown. First, a set of analytic workflows of an overall analytic workflow process is defined, 402. Then, a triggering 404 of an analytic workflow process is determined at 404. Incoming data may be annotated, 406, with metadata continuously in the data storage pool.

At the start of the analytic workflows, data from the data storage pool are moved, 408, from the data storage pool to the first analytic steps of the plurality of analytic workflows. In a continuous process, the analyzer module monitors, 410, all analytic steps of the executing analytic workflows. Thereby, the analytic module predicts the requirement for additional downstream data in the same or in a parallel analytic workflow for a later point in time (downstream), 412, 414. Also, in addition to require data from the data storage pool for a downstream analytic workflow may be predicted, 416.

In a continuous and parallel sub-process, the analyzer module communicates with the push module in forming the push module required for later analytic steps. The push module then fetches the data from the appropriate source(s), either from a running workflow process or from the data storage pool, potentially bypassing executing analytic processes in order to provision (i.e., moving, 418) the required data to a downstream analytic step. By doing this, it may be ensured that none of the analytic steps in the different analytic workflows need to pause or halt in order to receive an additionally required input data for the analytic step to be executed.

Referring now to FIG. 5, a block diagram of the analytic workflow system 500 for performing an analytic workflow process is shown. The analytic workflow system 500 includes data storage pool unit (or data storage pool) 302 (FIG. 2) adapted for storing data originating from a plurality of input sources, an in-memory database module (or in-memory database) 316 (compare FIG. 3) adapted for receiving data from the data storage pool, and an analytic workflow execution unit 502 adapted for performing at least one analytic workflow 202 in each of which a plurality of analytic steps (not shown) is executed by another plurality of computing nodes accessing the data in the in-memory database.

The system 500 also includes an analyzer module 210 adapted for identifying data in the data storage pool expected to be required for a downstream analytic step in the at least one analytic workflow. Thereby, the identified data have not yet been received in the in-memory database 316.

A push module 318 (FIG. 3) is adapted for moving the identified data from the data storage pool 302 to the in-memory database 316. Thereby, the push module 318 is triggered by the analyzer module 210.

The analyzer module 210 is also adapted for monitoring output data of an analytic step and identifying pointers stored in a pointer storage (not shown) to additional data expected to be required for a downstream analytic step of a parallel analytic workflow process different to the analytic step of the monitored output data. The push module 318 is also adapted for moving the data referred to by the pointers to the in-memory database.

Embodiments of the invention may be implemented together with virtually any type of computer, regardless of the platform being suitable for storing and/or executing program code. FIG. 6 shows, as an example, a computing system 600 suitable for executing program code related to the proposed method. The computing system 600 may be used for a plurality of different tasks and the proposed concept, e.g., as computer node, as a basis for a streaming analysis system for the trigger event unit (or trigger monitor) 314 (FIG. 3) as management system for the data storage pool 302, as management system for the in-memory database 316, as basis for the analyzer module 210 and/or push module 318, and so on.

The computing system 600 is only one example of a suitable computer system and is not intended to suggest any limitation as to the scope of use or functionality of embodiments of the invention described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of the computer system/server 600 via bus 606. It should be understood that, although not shown, other hardware and/or software components could be used in conjunction with computer system/server 600. Examples include, but are not limited to: microcode, device drivers, redundant processing units, external disk drive arrays, RAID systems, tape drives, and data archival storage systems, etc.

Additionally, the analytic workflow system 500 for performing an analytic workflow process may also be attached to the bus system 606.

The descriptions of the various embodiments of the present invention have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and typical procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for performing an analytic workflow process, comprising:
   in response to a trigger event, storing, by a computer, data originating from a plurality of input sources including at least one of online data sources and off-line data sources into a data storage pool including a plurality of storage units connected by a storage network;
   continuously annotating, by the computer, the data in the data storage pool with at least one class of a plurality of metadata classes using a classifier system trained to classify the data based on data patterns, the plurality of metadata classes including data required for further analytic workflow processes, transient data to be recorded on archives and highly relevant data associated with the trigger event;
   connecting, by the computer, an in-memory database for receiving data from the data storage pool to the storage area network;
   performing, by the computer, at least one analytic workflow in which a plurality of analytic steps are executed by a plurality of computing nodes accessing the in-memory database;
   identifying, by the computer, data in the data storage pool required for a first downstream analytic step in the at least one analytic workflow, wherein the identified data in the data storage pool have not been received in the in-memory database;
   transferring, by the computer, the identified data from the data storage pool to the in-memory database;
   monitoring, by the computer, output data of an analytic step in the plurality of analytic steps;
   identifying pointers to additional data in the data storage pool required for a second downstream analytic step of a parallel analytic workflow process different from the analytic step of the monitored output data; and
   transferring, by the computer, the additional data referred to by the pointers to the in-memory database.

2. The method according to claim 1, wherein the pointers point to data in the data storage pool or an output data of an upstream analytic step.

3. The method according to claim 1, wherein the plurality of input sources originate from a social media system, a mobile device, a transactional system, a streaming data source, sensor data, smart devices, and messaging systems.

4. The method according to claim 1, wherein the computing nodes are physically independent from each other or integrated into a compute complex.

5. The method according to claim 1, further comprising;
   triggering, by the computer, one or more analytic workflows dependent on an event identified in the data storage pool.

6. The method according to claim 1, wherein input data for the analytic step originate from:
   a previous analytic step in a similar analytic workflow;
   a previous analytic step in another analytic workflow; or
   the data storage pool.

7. The method according to claim 1, wherein the in-memory database is implemented in a random access memory or a flash memory of one or more computing nodes.

8. The method according to claim 1, further comprising:
   bypassing, by the computer, one or more analytic steps in the analytic workflow for provisioning data to a downstream analytic step; and
   annotating, by the computer, received data packages with a class of metadata classes.

9. A computer system for performing an analytic workflow process, comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
   in response to a trigger event, storing, by a computer, data originating from a plurality of input sources including at least one of online data sources and off-line data sources into a data storage pool including a plurality of storage units connected by a storage network;
   continuously annotating, by the computer, the data in the data storage pool with at least one class of a plurality of metadata classes using a classifier system trained to classify the data based on data patterns, the plurality of metadata classes including data required for further analytic workflow processes, transient data to be recorded on archives and highly relevant data associated with the trigger event;

connecting, by the computer, an in-memory database for receiving data from the data storage pool to the storage area network;

performing, by the computer, at least one analytic workflow in which a plurality of analytic steps are executed by a plurality of computing nodes accessing the in-memory database;

identifying, by the computer, data in the data storage pool required for a first downstream analytic step in the at least one analytic workflow, wherein the identified data in the data storage pool have not been received in the in-memory database;

transferring, by the computer, the identified data from the data storage pool to the in-memory database;

monitoring, by the computer, output data of an analytic step in the plurality of analytic steps;

identifying pointers to additional data in the data storage pool required for a second downstream analytic step of a parallel analytic workflow process different from the analytic step of the monitored output data; and transferring, by the computer, the additional data referred to by the pointers to the in-memory database.

10. The computer system according to claim 9, wherein the pointers point to data in the data storage pool or an output data of an upstream analytic step.

11. The computer system according to claim 9, wherein the plurality of input sources originate from a social media system, a mobile device, a transactional system, a streaming data source, sensor data, smart devices, and messaging systems.

12. The computer system according to claim 9, wherein the computing nodes are physically independent from each other or integrated into a compute complex.

13. The computer system according to claim 9, further comprising;
triggering, by the computer, one or more analytic workflows dependent on an event identified in the data storage pool.

14. The computer system according to claim 9, wherein input data for the analytic step originate from:
a previous analytic step in a similar analytic workflow;
a previous analytic step in another analytic workflow; or
the data storage pool.

15. The computer system according to claim 9, wherein the in-memory database is implemented in a random access memory or a flash memory of one or more computing nodes.

16. The computer system according to claim 9, further comprising:
bypassing, by the computer, one or more analytic steps in the analytic workflow for provisioning data to a downstream analytic step.

* * * * *